Sept. 5, 1933.  W. H. BROOKS  1,925,787
METHOD OF PRODUCING HOMOGENEOUS LIQUIDS
Original Filed July 7, 1928
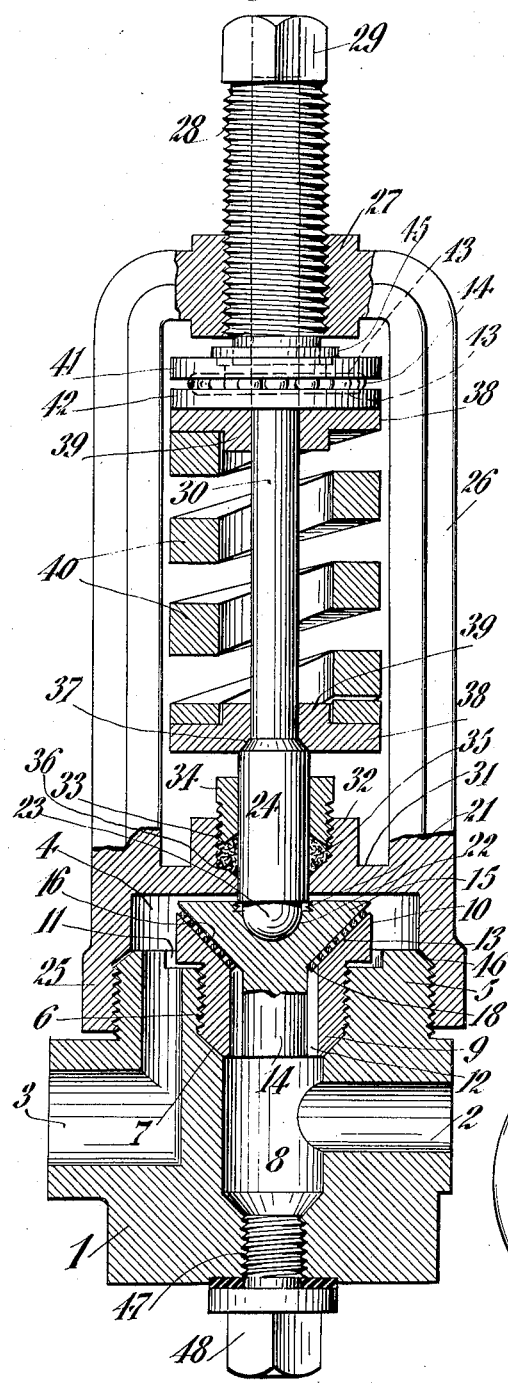
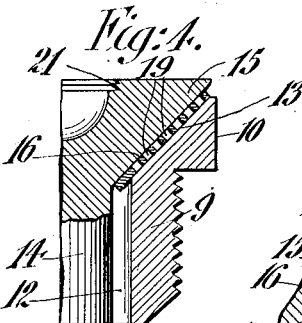
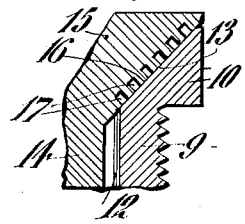
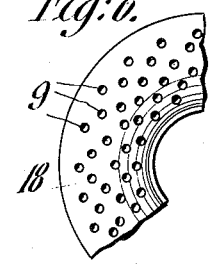
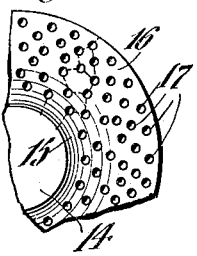
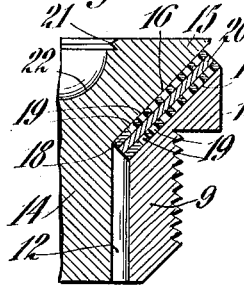
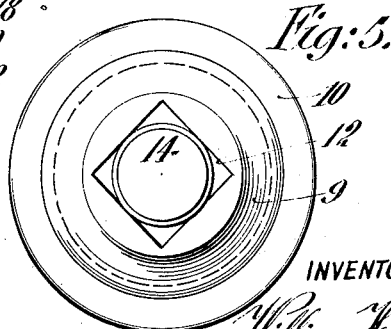
INVENTOR
William H. Brooks
BY C. P. Goepel
ATTORNEY.

Patented Sept. 5, 1933

1,925,787

UNITED STATES PATENT OFFICE 1,925,787

METHOD OF PRODUCING HOMOGENEOUS LIQUIDS

William H. Brooks, Oconomowoc, Wis., assignor to Carnation Company, Milwaukee, Wis., a corporation of Delaware Original application July 7, 1928, Serial No. 291,018. Divided and this application September 14, 1929. Serial No. 392,607

1 Claim. (Cl. 99—11)

This invention relates to an improved method for producing homogeneous liquids, especially liquids which are a mixture of two or more ingredients differing in density and other characteristics.

An object of the invention is to provide a method of homogenization by which the defects of previous improvements in this field are obviated. Heretofore liquids to be rendered homogeneous and uniform in composition; especially liquids containing one or more fatty or oily substances, such as milk bearing globules of butter fat; have been treated for the purpose by passing them at high pressure between surfaces in close proximity; and at the usual velocities or rates of flow, the wear on such surfaces has been rapid and extensive. Hence poor results are secured in operation, and frequent and very accurate refitting becomes necessary. Where only two adjacent surfaces have been utilized, conditions have always been very troublesome and where a larger number of such surfaces were included, accurrate fitting has been found almost impossible. Hence the passages between said surfaces through which the liquid was passed often became such that the liquid in passing through them met with too little resistance to afford effective operation; and the liquid when delivered was apt to show very slight change in character, and little or no approach whatever to the degree of homogeneity and uniformity desired.

It is therefore, the primary object of my present invention to provide a new method of homogenizing liquid or semi-liquid products by means of which a more thorough and uniform dispersion of the difficultly emulsifiable ingredients of the product is obtained, but also the objectionable and excessive wear upon the parts of the homogenizing apparatus requiring more or less frequent and expensive repairs will be obviated.

The invention can be utilized in the case of milk to break up globules of butter fat and the like into much smaller particles, and to divide particles of cream to such an extent that same will thereafter remain in suspension and not collect on the surface of the milk. This result can be obtained with raw or fresh milk when separated for standardizing, by adding a definite amount of butter to a definite amount of skimmed or separated milk, which is later made homogeneous, and can be sold as an improved product for infant, child and invalid feeding, being more easily digestible because of its greater uniformity. The invention can also be utilized in the treatment of condensed and evaporated milk to prevent or materially retard separation of butter fat in the containers during the interval between the manufacture of the milk and consumption, as well as to make a more palatable, uniform, smooth and lumpless product; for ice cream the same procedure may be followed.

Further my invention is by no means restricted to the treatment of milk and milk products, but it can be utilized for the compounding of lubricating oils with grades of oil of various density and viscosity, to secure uniformity throughout and avoid separation of light and heavy components; in the manufacture of greases and semi-fluid lubricants, to make products which will not harden under low temperatures by adding components which do not so harden, usually the more fluid component is apt to separate during storage and under higher temperature; and the invention can further be utilized similarly in the manufacture of soaps, cosmetics, emulsions of oils, such as cod liver, castor and petroleum oils masked with fluids and pastes surrounding the microscopic globules of oil with more or less fluid substance of less disagreeable odor, taste and appearance; and to improve the oils themselves in regard to their digestibility and qualities of lubrication or assimilation, due to their homogeneous and more finely divided condition.

With the above and other objects in view, the nature of my improved method of homogenization may be readily ascertained from the following description considered in connection with the typical example of a practical form of apparatus whereby the said method may be performed and illustrated in the accompanying drawing, and in which—

Figure 1 shows a device by which the result desired can be obtained in the practice of my invention;

Fig. 2 is a detail view of two cooperating parts in section between which the ingredients of the liquids are forced to flow under such conditions that uniformity and homogeneity ensue;

Fig. 3 is a bottom plan view of a portion of one of the parts shown in Fig. 2;

Fig. 4 is a sectional view showing a modification of the construction of Fig. 2;

Fig. 5 is an end view of Fig. 4;

Fig. 6 is a bottom plan view of a portion of one of the parts shown on Fig. 4; and Fig. 7 is similar to Fig. 2 showing another modification.

On the drawing the same numerals identify the same parts throughout.

In the particular illustrated example of apparatus by means of which my invention is practiced, the numeral 1 indicates a head having an inlet passage 2 and an outlet passage 3; the inlet passage 2 leading to an enclosed space or chamber 4 which delivers to the outlet 3 and in which the liquid undergoes the necessary treatment to impart to it the required physical character. The part 1 has a threaded neck 5 through which the outlet 3 communicates with the chamber 4 and this part is also provided with a central threaded bore 6 terminating in a conical seat 7 below which is a smaller bore 8 communicating with the inlet 2. Into the threaded bore 6 and engaging the conical seat 7 I screw a threaded bushing or sleeve 9 having a head 10 and the outer end or entrance to the threaded bore 6 may be counterbored, as indicated at 11 to receive the head 10. The head 10 has a passage extending through it, as indicated at 12, to connect the space 8 with the chamber 4, and this passage is square or has a shape which is other than circular.

The extremity of the bore or passage 12 at the head 10 is expanded to provide a conical surface 13; and fitting into the passage or bore 12 is a stem 14 having a conical head 15. The stem or shank 14 is preferably round and the head 15 is conical like the head of a valve forming a surface 16 which matches and cooperates with the surface 13 in the end of the sleeve 9. Hence the liquid to be treated on entering the inlet 2 and reaching the space 8, can flow through the bore or passage 12 between the stem 14 and inside surface of the sleeve 9, and then by way of the annular channel between the surfaces 13 and 16 to the chamber 4 and be discharged by way of the outlet 3. The valve-shaped body comprising the shank 14 and head 15 is held firmly in position, and while passing between the surfaces 13 and 16 the liquid is so affected as to receive the characteristics desired.

In most prior constructions the surfaces 13 and 16 have been made smooth and shaped to fit each other accurately, so that if nothing intervened the surfaces 13 and 16 could come into contact over their entire extent. As the liquid to be treated was forced between two such surfaces as 13 and 16 at the necessary pressure and velocity, these surfaces quickly became eroded and pitted; giving rise to defective operation and requiring frequent and very accurate refitting. In the practice of my invention, however, I avoid such erosion and wear by altering one or both of the surfaces 13 and 16 in such a way that, while the liquid is forced through at the same pressure and velocity the wearing away of the surfaces is prevented; the ingredients of the liquid are thoroughly and intimately mixed and the effective life of the parts is vastly increased.

To achieve the objects of my invention, I proceed as shown fully in Figs. 2, 3, 4 and 5. Referring first to Figs. 2 and 3, I make the conical surface 13 smooth, as before, but the surface 16 is shown as being pitted by a number of small recesses 17. These recesses 17 are arranged in radially spaced circular rows on the conical surface 16, all concentric in the embodiment shown, but the recesses or indentations in each row, instead of being in line with one another radially, are so situated that the recesses or indentations of successive rows are staggered. Hence when the liquid is forced between the two surfaces 13 and 16, it does not take a straight radial path but has a tendency to follow the zig-zag line of flow indicated by the dotted lines in Fig. 3. This tendency is due to the fact that the liquid takes the shortest path between adjacent recesses and as said recesses fill up they form minute pools. In its flow the liquid is simply transferred from one of these pools to another until it is delivered into the chamber 4. The recesses or indentations are of slight depth but they serve to prevent the liquid from issuing or spurting too rapidly into the chamber 4 and thus the usual erosion and wear are eliminated. In its passage through the annular chamber between the smooth surface 13 and indented surface 16, the heavy and light components of the liquid are attenuated, finely divided and thoroughly commingled and when the liquid is delivered through the outlet 3, the components are so fully disseminated through the body of the liquid that it has the uniform and homogeneous character which is desired.

The mating surfaces forming the passage for the milk film are very closely related to each other and fitted together with extraordinary care. While such accurately fitted mating surfaces would alone result in a certain degree of homogenization, I have found that much greater efficiency with a finer subdivision and more uniform dispersion of the milk fat is obtained with appreciably less wear upon said mating surfaces by causing the milk film to traverse a multiplicity of spaced pools of milk of small area located in the path of flow of the milk film, as by the formation of the pool collecting recesses or indentations in one of said mating surfaces. Thus, as the milk film is projected under velocity pressure between these surfaces, the fat globules which are flattened or attenuated between said surfaces upon entering said pools are broken away from the milk film and there surrounded by a cover of serum, the fat returning to its globular form and being prevented from amalgamating with other fat globules, and thereby retained in permanent suspension or emulsion with the other constituents of the milk. As the fat globules are successively transferred under pressure of the milk film and in the direction of flow thereof from one pool to another between the ingress and egress edges of said mating surfaces, this action is repeated, the portions of butter fat being thus repeatedly subdivided and caused to assume smaller globular form. In other words, this continued movement from pool to pool, subjects the globules to repeated flattening or tension, and while under tension, the individual globules are subdivided, such subdivision resulting from the shearing action which occurs as the fat globule leaves the pool between the closely fitted metallic confining surfaces. This shearing disintegrating action upon the fat globules occurring a great number of times in the passage of the film between the metallic confining surfaces, insures against the return of the milk fat to its original larger globular form. It is also likely that some microscopic fat globules imbed themselves in the crystalline crevices of the metallic surfaces and grind down other fat globules by a process of attrition, during which some electrical potential may arise, thus aiding in the formation of smaller globules and preventing these smaller globules from coalescing into globules of larger diameter. The action above referred to is facilitated by the conical form of the milk film and the increasing area of the tapered mating surfaces, which results in a progressively decreasing velocity of the film between the ingress and egress edges of said surfaces. My present method obviates the necessity of placing reliance directly upon high velocity pressure in order to obtain proper homogenization as in the methods of the prior art heretofore employed. In the operation of my new method, the pressure need only be sufficient to cause the continuous flow of the milk film between the mating metallic surfaces and its discharge from the outer edges of these surfaces. Any increase in pressure merely results in an increase in capacity output, and is without effect upon the efficiency of the homogenizing action.

In the construction shown in Figs. 4, 5 and 6, the cooperating surfaces 13 and 16 are both smooth but in between these two surfaces I place a perforated conical member 18 having apertures 19. These apertures 19 act in the same way as the recesses or indentations 17, causing the liquid to flow diagonally between the surfaces 13 and 16 because the apertures 19 are staggered in the same way as the recesses 17. This part 18 may be made of some material which is softer than the heads 10 and 15. The wear may be more rapid on the part 18 than on the surfaces 10 and 16, but all that is needed to insure continuous, efficient operation is to replace the part 18 at frequent intervals. Frequent refitting or grinding or polishing of the surfaces 13 and 16 becomes unnecessary.

In Fig. 7 I show two members 18 having apertures 19, one in contact with each of the surfaces 13 and 16, separated by an imperforate conical member 20. This part 20 may be as hard as the parts carrying the surfaces 13 and 16, and the two perforated members 18 may be as soft as before. In some cases the intervening member 20 may be perforated, grooved or corrugated but in any event such spaced portions are disconnected or discontinuous; and the apertures 19 in the two members 18 are staggered as before so that the liquid takes a zig-zag path from the passage 12 to the chamber 4.

In each of the illustrated constructions, it will be seen that the liquid flows under pressure in a single direction through the homogenizing zone, and while maintaining the film formation of the liquid, at spaced points in said zone the constituent elements of the liquid are subjected to a repeated shearing, disintegrating action as the film flows over the surfaces of the liquid pools which collect in the indentations, recesses or openings provided in one of the mating surfaces of the homogenizer. It is found that this maintenance of the initial film formation of the liquid throughout its passage through the homogenizing zone, instead of repeatedly breaking up and re-forming the film or diverting its course of flow in several directions, enables a much lower initial pressure to be used than has heretofore been customary, without lessening the efficiency in the homogenizing action.

The head 15 is centrally recessed as shown at 21 and this recess may have a concave bottom 22 to receive the rounded end 23 of a plunger 24, which urges the head 15 toward the head 10 so as to make the surfaces 13 and 16 keep close to each other as shown in Figs. 2 and 3, and to have the same effect in the structure shown in Figs. 4, 5, 6 and 7. The threaded part 5 of the neck screws into a hollow head 25 which has an internally-threaded rim and contains the chamber 4. Made rigid and preferably integral with this head 25 is a yoke 26, comprising arms which are united by a threaded bearing 27 in which is screwed a threaded sleeve 28 bearing a head 29, so that it can easily be turned. The inside of this sleeve has a smooth bore to receive the stem 30 attached to the plunger 24. The top of the head 25 is shown closed at 31, and it has a central boss 32 with internal threads to engage a packing gland 34. This gland 34 compresses packing 35 against a conical shoulder 36 on the inside of the boss 32; which of course is bored all the way through to enable the plunger 24 to project through the top 31 and the head 25 and into the chamber 4 to engage head 15.

The plunger 24 is united to the stem 30 by a conical shoulder 37, and carries a disc-shaped abutment 38, which abuts against the shoulder 37. This abutment 38 has a central boss 39, which is encircled by one end of a spring 40. The other end of the spring engages a similar abutment on the stem 30, and between this abutment and the bearing 27, are discs 41 and 42, each of which is recessed at 43 so as to receive an anti-frictional element 44, thus a ball bearing is provided which is between the upper abutment 38 of the spring 40 and a washer 45, which may abut against the inner end of the threaded sleeve 28. This sleeve 28 may be turned to compress the spring 40 to the required degree, and the ball bearing reduces the friction of the parts when the adjustment is made.

The threaded neck 5 and the inside of the head 25, may be provided with matching conical surfaces to receive a packing gland 46, so as to make the chamber 4 leakproof. Further, the space 8 may open through the bottom of the head 1 and which may be threaded as at 47 to receive a threaded closing plug 48.

In the complete device shown in Fig. 1, the construction illustrated in Figs. 2 and 3 may be employed; or that shown in Figs. 4 and 5, or the device shown in Fig. 6. In Fig. 2 the spring makes the surface 13 and the indented surface 16 engage each other; but the parts 9 and 10 can still be moved to a sufficient extent when the liquid is forced in through the inlet 2 to enable the liquid to find its way into the chamber 4, and the same action takes place with the other constructions.

In operation suppose milk containing cream or globules of butter fat is the liquid to be treated. This liquid is forced through the inlet 2 and it makes its way into the chamber 4. If the construction utilized in Figs. 2 and 3 be employed, the milk takes a zig-zag path between the heads 10 and 15 of the chamber 4 and the particles of cream are so finely divided and evenly distributed that when the liquid is discharged at the outlet 3, it has all the homogeneity required. The annular channel between the surfaces 13 and 16 is not obstructed but the indentations 17 or pits keep the velocity from becoming too great and wearing away the two surfaces 13 and 16. The construction shown in Figs. 4, 5 and 6 are preferred forms of my invention because when the relatively soft member or members 18 become worn they can cheaply be replaced and the heads 10 and 15 with their surfaces 13 and 16, do not need any refitting. With these devices the latter parts can be operated with great efficiency over long periods.

While the apparatus is especially adapted for the treatment of milk, I of course can use it just as well for the treatment of other substances, for example, a liquid containing any kind of oil can be treated and so modified that the oil will be finely divided and evenly distributed through the whole body of the liquid. Hence I can use the method for the production of emulsions and medicines; and where the liquid contains oil and is intended for use as a medicine taken in combination with something else to modify either the taste or the action of the oil, the particles of oil can be so finely divided that each will be covered with a coating of a different liquid, so as to afford the desired effect. The liquid to be treated need not belong to the class of substances which are to be taken into the human system as either food or medicine; but it can also be employed for the mixing of paints, lubricating oils containing ingredients of various density and viscosity, and similarly treating any other substances. The efficiency of my invention is due not only to the fact that the path of the liquid is made longer from bore 12 to the chamber 4, but also to the fact that the recesses 17 of Fig. 2 and the corresponding recesses or indentations 19, or pits, Figs. 3, 4, 5 and 6 permit the formation of small pools, each separated from the other in disconnected or discontinuous fashion. Such separated pits serve to break up and to hold the fat particles in separated broken form instead of gathering or collecting the same and thereby acting as accumulations of the fat particles as is the case in certain prior art devices which employ continuous grooves or grooves connected with the pools. The method forming the basis of this application consists in flattening out the fat particles between the flat parallel surfaces, and then separating the flattened particles into smaller portions and holding them so separated without being able to again join together, and then again flattening the separated particles, and in turn subdividing these, without allowing them to join or accumulate, and the liquid flows from one of these pools to another in continuously changing direction on its way to the chamber 4. Thus the flow of liquid is not retarded; its velocity can be maintained at the required point; but the liquid is prevented from flowing with too great acceleration into the chamber 4; as it would do if the matching surfaces 13 and 16 were preferably smooth and with no such members as are indicated on the drawing at 18 and 20 between them.

The subject matter of this application is disclosed in my pending application Serial No. 291,018, July 7, 1928, and of which the present application is a division.

I have shown the preferred mode of operation of my improved method, but changes may be made therein without departing from the spirit of the invention as herein described and hereinafter claimed.

I claim:

The method of homogenizing liquids, which consists in subjecting a fat containing fluid while under movement, from its inflow to its outflow, to a yielding pressure to flatten the fat globules of the fluid, said fluid flow having a substantially uniform depth and simultaneously at intervals enlarging the fluid flow to a greater depth than the aforesaid substantially uniform depth, said enlargements of the fluid flow being laterally disconnected from each other and offset in the direction of the outflow from the next adjacent enlargements, whereby the flattened fat is subdivided into disconnected and discontinuous portions, and such portions, as they move toward the outflow, are again separated by subdividing them into further disconnected and discontinuous portions, none of said subdivided portions joining with each other, during the movement of the fluid from its inflow to its outflow.

WILLIAM H. BROOKS.